United States Patent [19]

Yamada et al.

[11] Patent Number: 5,220,117
[45] Date of Patent: Jun. 15, 1993

[54] ELECTRONIC MUSICAL INSTRUMENT

[75] Inventors: Hideo Yamada; Masahiro Shimizu, both of Hamamatsu, Japan

[73] Assignee: Yamaha Corporation, Hamamatsu, Japan

[21] Appl. No.: 793,996

[22] Filed: Nov. 18, 1991

[30] Foreign Application Priority Data

Nov. 20, 1990 [JP] Japan .................................. 2-314690

[51] Int. Cl.$^5$ .............................................. G10H 7/00
[52] U.S. Cl. ........................................ 84/600; 84/607; 84/615
[58] Field of Search .................. 84/600, 625, 624, 601, 84/658, 660, 607, 615, 653

[56] References Cited

U.S. PATENT DOCUMENTS 4,554,857  11/1985  Nishimoto ............................. 84/624
5,033,352   7/1991  Kellogg et al. ........................ 84/660

Primary Examiner—William M. Shoop, Jr.
Assistant Examiner—Helen Kim
Attorney, Agent, or Firm—Graham & James

[57] ABSTRACT

An electronic musical instrument, which is configured to simulate one or more instruments, provides a sound source, a display unit and a control portion. Herein, under control of the control portion, the display unit displays the predetermined graphic pattern corresponding to the tone-generation mechanism, i.e., tone-generation algorithm of an instrument to be simulated. The sound source contains a drive portion, a tone-generation portion and a resonance-radiation portion, each of which further contains a digital signal processor (DSP). All of these portions function to create a digitized musical tone signal corresponding to a simulated sound of the instrument by combining operation data outputted from the DSPs. By controlling the display unit, it is possible to arbitrarily vary the contents of the displayed tone-generation algorithm, so that the performer can easily and freely perform a music on this electronic musical instrument.

4 Claims, 17 Drawing Sheets

FIG. 4 (MAIN ROUTINE)

(ALGORITHM SELECTION ROUTINE)

(DEVICE SELECTION ROUTINE)

(PARAMETER SETTING ROUTINE)

FIG.14 (PLAY ROUTINE)

FIG. 15 (CONTROL ROUTINE)

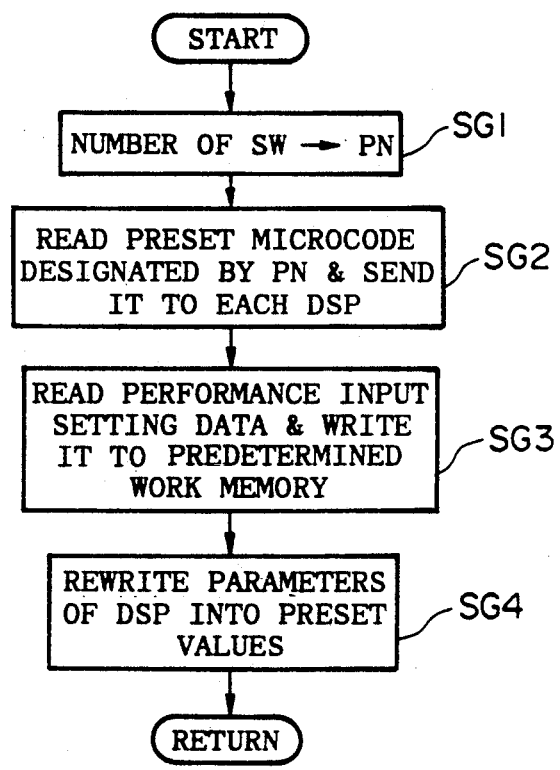
FIG.17 (PRESET CALL ROUTINE)

ELECTRONIC MUSICAL INSTRUMENT

BACKGROUND OF THE INVENTION

1. Field of the Invention

The present invention relates to an electronic musical instrument which is suitable for synthesizing a desirable musical tone by combining plural sounds.

2. Prior Art

Recently, there are developed several kinds of electronic musical instruments each of which activates a simulation model of a tone-generation mechanism of a non-electronic musical instrument so as to synthesize its musical tone. Such music synthesis technique is disclosed in the papers such as U.S. Pat. Nos. 4,984,276 and 4,130,043. Herein, there is disclosed an electronic musical instrument which simulates a tone-generation mechanism of the wind instrument such as the clarinet. In addition, the above-mentioned papers also disclose about the electronic musical instruments which simulate tone-generation mechanisms of the string-plucking-type instrument such as the guitar and string-striking-type instrument such as the piano.

Meanwhile, currently produced electronic musical instrument may provide plural FM sound sources called "operators". By arbitrarily combining some of these operators, a desirable musical tone is to be synthesized. In addition, the above-mentioned electronic musical instrument provides a liquid crystal display (i.e., "LCD") which displays the combining state or connecting manner of these operators. This combining state of the operators is called "algorithm" which is an important element for determining the tone color of the musical tone to be generated. By use of this algorithm, the user of this electronic musical instrument can acknowledge the physical combination of the sound sources. Therefore, by changing the contents of this algorithm, it is possible to carry out the sound synthesis or sound composition with ease.

When applying the above-mentioned function to the conventional electronic musical instrument which simulates the tone-generation mechanism of the non-electronic musical instrument, it is possible to carry out the varied sound synthesis by arbitrarily combining some of the tone-generation mechanisms of the non-electronic musical instruments. However, when using the different musical instrument to be simulated, such electronic musical instrument must require completely different tone-generation algorithm or its operation parameters. For this reason, when carrying out the sound synthesis by freely using several kinds of the tone-generation mechanisms, it is required for the user to have the expert knowledge concerning the tone-generation mechanism of the instrument itself to be simulated. This is difficult for the non-professional user who does not have the expert knowledge about the musical instrument, because such user cannot figure out the setting manner of the algorithm or operation parameters. Thus, there is a problem in that the sound synthesis is very difficult for the users.

SUMMARY OF THE INVENTION

It is accordingly a primary object of the present invention to provide an electronic musical instrument which can carry out the sound synthesis by freely using several kinds of the tone-generation mechanisms of the non-electronic musical instruments with ease.

In a first aspect of the present invention, there is provided an electronic musical instrument comprising:

drive means for generating an excitation signal corresponding to tone-generation energy;

tone-generation means for resonating the excitation signal so as to output a resonated signal;

display means for displaying tone-generation algorithms defined by operation manners of the drive means and tone-generation means respectively in form of the graphics or graphic patters; and algorithm control means for varying the operation manners of the drive means and tone-generation means displayed by the display means and/or combining them so as to control the tone-generation algorithms.

In a second aspect of the present invention, there is provided an electronic musical instrument comprising:

sound source means for outputting a musical tone signal in accordance with a tone-generation algorithm which is predefined for each of instruments to be simulated;

display means for displaying the tone-generation algorithm in form of a predetermined graphic pattern; and algorithm control means for controlling the display means to thereby vary the contents of the tone-generation algorithm in accordance with an operation made by a performer.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings:

FIG. 17 is a flowchart showing a preset call routine.

DESCRIPTION OF THE PREFERRED EMBODIMENT

Figure 1:
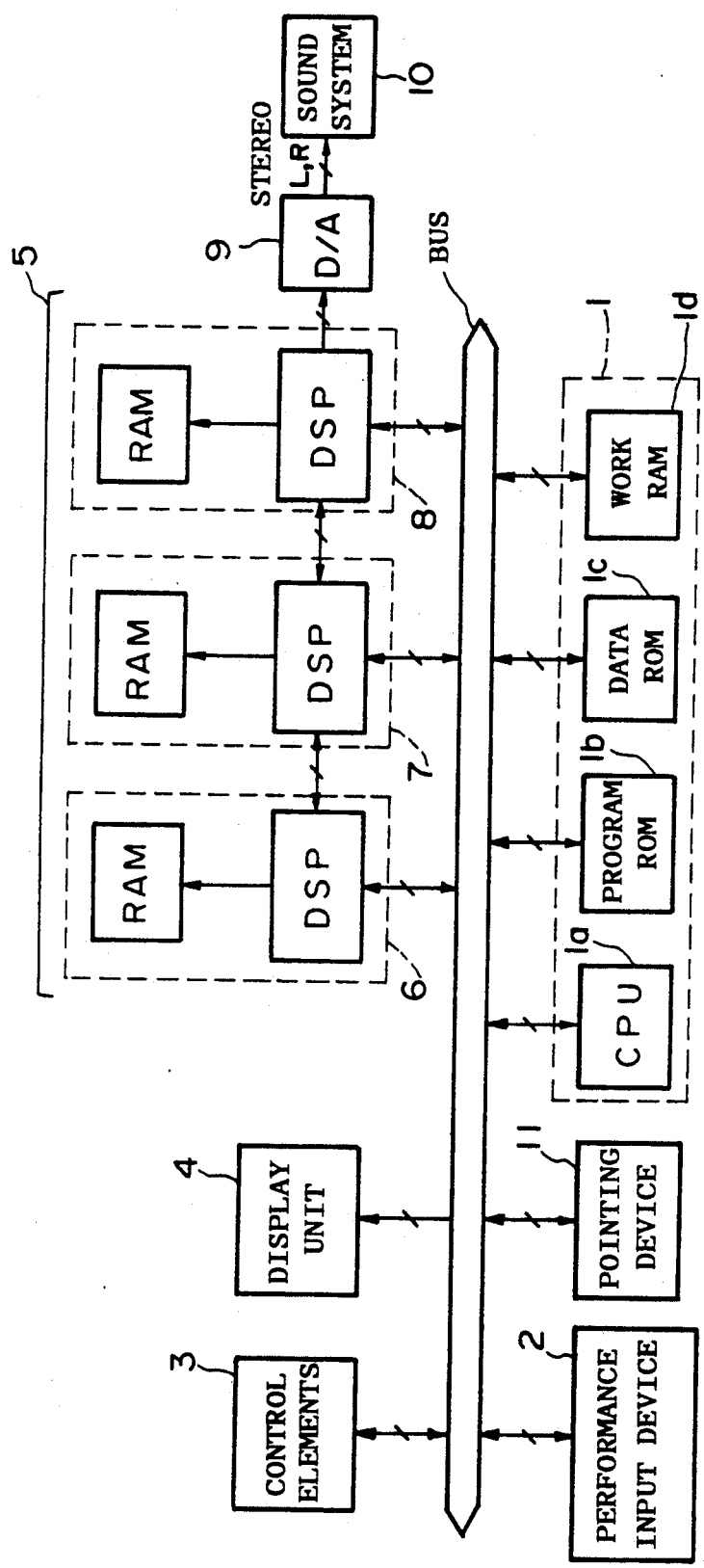
FIG. 1 is a block diagram showing the whole configuration of an electronic musical instrument according to an embodiment of the present invention.

Now, description will be given with respect to an embodiment of the present invention by referring to the drawings.

[A] Configuration

FIG. 1 is a block diagram showing the whole configuration of an electronic musical instrument according to an embodiment of the present invention. In FIG. 1, 1 designates a control portion which controls several portions of this instrument in real-time manner. This control portion 1 consists of a central processing unit (CPU) 1a, a program read-only memory (ROM) 1b, a data ROM 1c and a work random-access memory (RAM) 1d. The CPU 1a up-loads programs read from the program ROM 1b, and then it executes the loaded programs so as to control several portions. In the present specification, its operations will be described later. In addition to several kinds of control programs to be used by the CPU 1a, the program ROM 1b memorizes other kinds of micro-programs to be loaded to the digital signal processor (DSP), which operation will be described later. Further, the data ROM 1c stores data tables which are used for the data conversion. Furthermore, the work RAM 1d is used as the work area of the CPU 1a, so that it temporarily stores several kinds of data. Meanwhile, 2 designates a performance input device which contains performance input elements such as the keyboard and wheel so as to create performance information corresponding to the operation to be made thereto by the performer. In addition, 3 designates several kinds of control elements such as the slide volume-controls and key switches which are arranged on the control panel (not shown). Further, 4 designates a display unit which is configured as the LCD and the like, so that it is designed to display the contents of several kinds of data given from the foregoing control portion 1.

5 designates a sound source which simulates the tone-generation mechanism of the non-electronic musical instrument, e.g., wind instrument such as the clarinet, string-bowing-type instrument such as the violin, string-plucking-type instrument such as the guitar and string-striking-type instrument such as the piano. This sound source 5 contains a drive unit 6, a tone-generation unit 7 and a resonance-radiation unit 8. Each of them is configured by "DSP" and "RAM", wherein "RAM" temporarily stores several kinds of operation data of "DSP". Incidentally, configuration and operation of these units 6-8 will be described later. Meanwhile, 9 designates a digital-to-analog converter which converts the digital musical tone signal outputted from the sound source 5 into the corresponding analog signal. Further, 10 designates a sound system which generates a musical tone corresponding to the musical tone signal supplied thereto. Furthermore, 11 designates a pointing device made by the mouse-type device and the like. This pointing device 11 is used to point out the predetermined position in the display area of the display unit 4.

Figure 2:
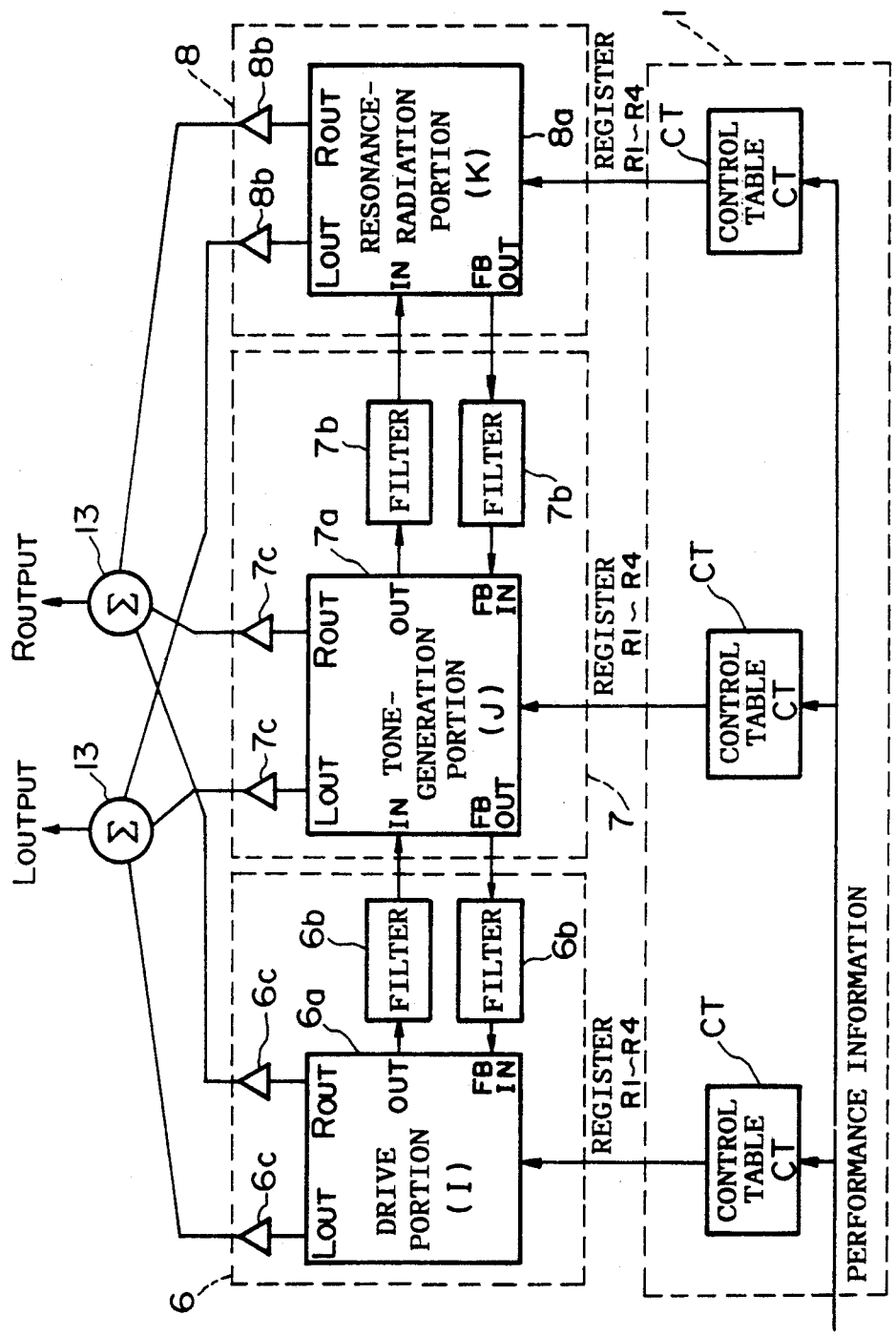
FIG. 2 is a block diagram showing a detailed configuration of a sound source shown in FIG. 1.

Next, detailed description will be given with respect to the above-mentioned sound source 5 by referring to FIGS. 2 and 3. FIG. 2 is a block diagram showing a functional configuration of the sound source 5, wherein parts corresponding to those shown in FIG. 1 will be designated by the same numerals. In FIG. 2, CT designates a control table to be set in the predetermined memory area of the foregoing data ROM 1c. This control table CT is used to convert the performance information, supplied thereto via the CPU 1a, into sound source parameters. The drive unit 6 generates an excitation signal corresponding to the instrument to be simulated, and this excitation signal is supplied to the tone-generation unit 7. This excitation signal corresponds to the energy which is required for the tone generation. For example, when this drive unit 6 is designed to simulate the wind instrument such as the clarinet, this excitation signal corresponds to the blowing pressure or Embousure. In drive unit 6, 6a designates a drive DSP which embodies the function of the drive unit 6. This drive DSP 6a is supplied with micro-programs corresponding to the operation manner of the instrument to be simulated. Thus, the drive DSP 6a creates the excitation signal corresponding to the sound source parameters to be set to its internal registers R1–R4. In the drive unit 6, two filters 6b, 6b are respectively provided on the output line and feedback line coupled to the tone-generation unit 7. Each of these filters is provided for avoiding an anomalous oscillation of the signal passing therethrough at the specific frequency. Herein, filter coefficients of these filters, i.e., their frequency characteristics are controlled by the drive DSP 6a. Further, two buffers 6c, 6c shape waveforms of the stereo musical tone signal (i.e., "Lout" and "Rout" signals) outputted from the drive DSP 6a.

The tone-generation unit 7 corresponds to the vibration source of the instrument to be simulated, which consists of a tone-generation DSP 7a, filters 7b, 7b, and buffers 7c, 7c. The tone-generation DSP 7a is supplied with the micro-programs which correspond to the operation manner of the instrument to be simulated. Further, it oscillates the excitation signal in response to the sound source parameters set to the internal register R1–R4. The filters 7b, 7b are designed to simulate the frequency characteristic corresponding to the case where the musical tone sounded from the tone-generation portion of the actual instrument is transmitted toward the resonance-radiation portion or it is reflected by the resonance-radiation portion and then returned back to the tone-generation portion.

The resonance-radiation portion 8 embodies the resonance and radiation characteristics of the instrument to be simulated, which consists of a resonance-radiation DSP 8a and buffers 8b, 8b. This resonance-radiation DSP 8a is supplied with the micro-programs corresponding to the operation manner of the instrument to be simulated. Further, it simulates the resonance-radiation characteristic corresponding to the sound source parameters set to the internal registers R1–R4.

Figure 16:
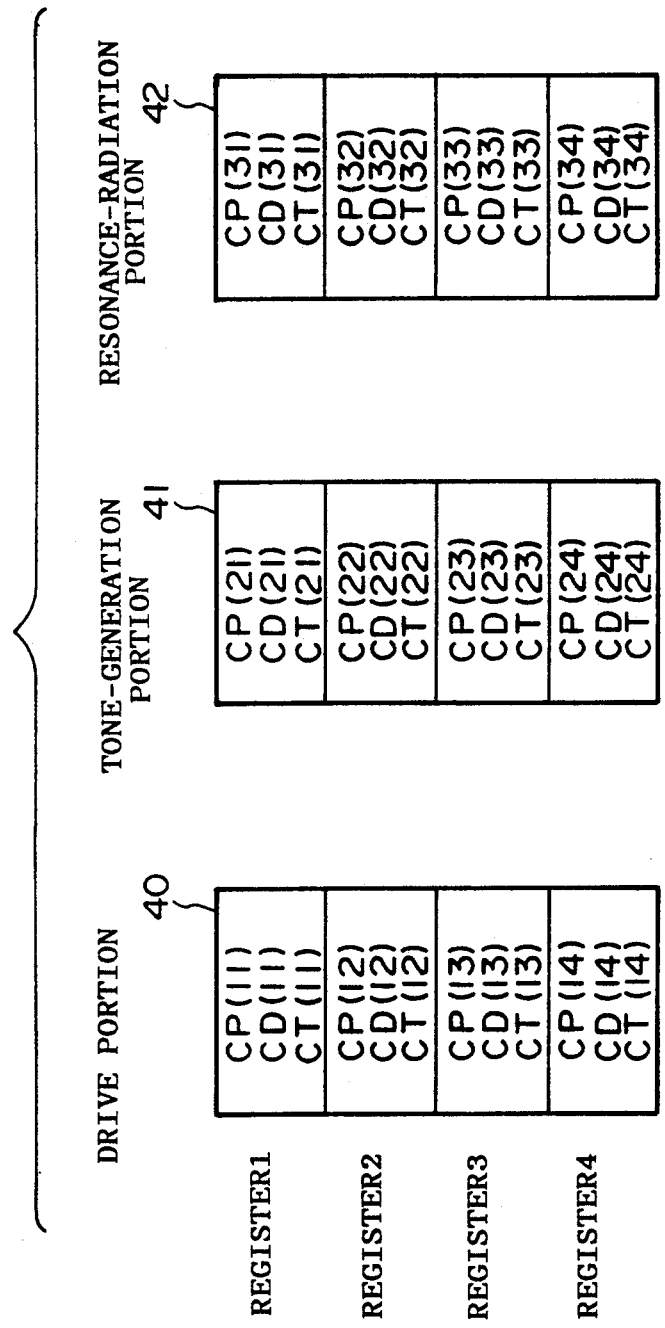
FIG. 16 shows a conceptual configuration of internal registers of each DSP.

Next, detailed description will be given with respect to configurations of the internal registers R1–R4 provided in each of the DSPs 6a, 7a, 8a by referring to FIG. 16. In FIG. 16, 40–42 designate internal register portions of the drive DSP 6a, tone-generation DSP 7a and resonance-radiation DSP 8a respectively. Each of these internal register portions 40–42 is divided into four registers R1–R4, each of which is set with control parameter CP, control device CD and control table CT. This control parameter CP is the data which designates the operation of the instrument to be simulated. For example, when the drive DSP 6a is designed to simulate the string-bowing-type instrument such as the violin, data representing the bowing velocity is set to CP(11) and data representing the bowing pressure is set to CP(12). On the other hand, the control device CD indicates the number of the performance input element by which the performance information is supplied to No.s (where s=1-4) register of each DSP. The control table CT is used to carry out the "scaling" on the performance information supplied from the performance input element designated by the control device data CD.

In the sound source 5 which is configured as described above, the excitation signal outputted from the drive unit 6 is subject to the oscillation in the tone-generation unit 7, and the oscillated signal is supplied to the resonance-radiation unit 8. In this resonance-radiation unit 8 which simulates the reflection terminal of the actual instrument, the oscillated signal is converted into the feedback signal which is then returned to the unit 6 via the unit 7. In the above-mentioned circulating of the signal, the musical tone signal is to be formed. This musical tone signal is outputted from the output terminals Lout, Rout of each of the DSPs 6a, 7a, 8a. Then, all of the musical tone signals are added and mixed together in mixers 13, and consequently it is possible to output the musical tone signal having the stereophonic components.

Figure 3:
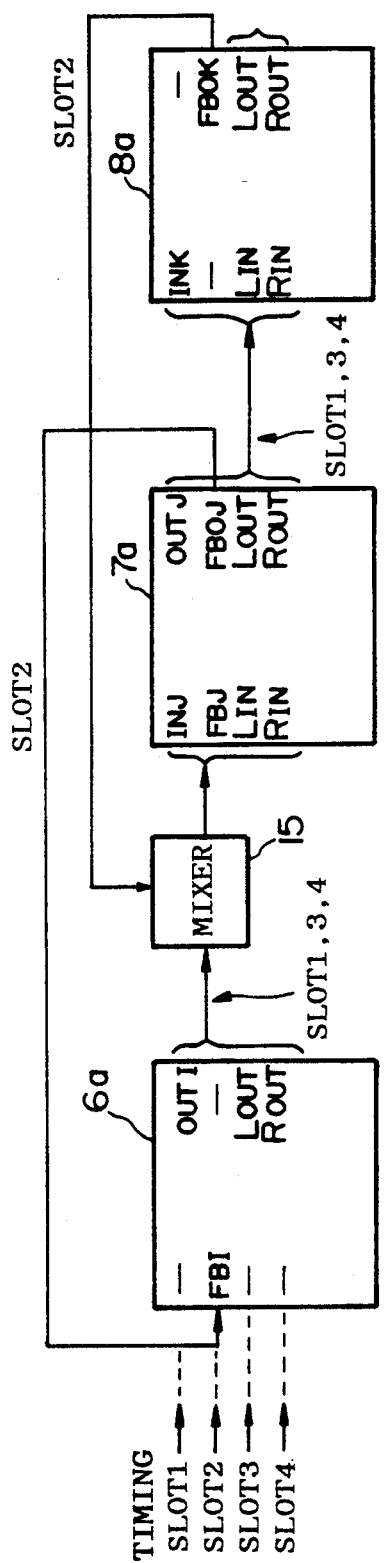
FIG. 3 is a system diagram showing a connection manner of DSPs used in the sound source shown in FIG. 2.

Next, FIG. 3 is a system diagram for explaining the data communication to be performed among the DSPs. Each of the DSPs 6a, 7a, 8a has the communication port having four channels by which 4-channel communication is carried out in time sharing manner. As shown in FIG. 3, the data communication is made in the predetermined order from "slot 1" to "slot 4" in time sharing manner. At first timing corresponding to slot1, the excitation signal outputted from "DSP6a(OUTI)" is supplied to "DSP7a(INJ)" via a mixer 15, while the oscillated signal is supplied to "DSP7a(INK)" from "DSP7a(OUTJ)".

At next timing of slot 2, the foregoing feedback signal from "DSP8a(FBOK)" is supplied to "DSP7a(FBJ)" via the mixer 15, while it is returned from "DSP7a(FBOJ)" to "DSP6a(FBI)". Thus, the signal circulating is made in the closed-loop. Such signal circulation is made at timings of slots 3 and 4.

At timing of slot 3, the musical tone signal corresponding to the stereophonic left-channel component is outputted from "DSP6a(Lout)", and it is inputted into "DSP7a(Lin)" via the mixer 15. Then, it is supplied from "DSP7a(Lout)" to "DSP8a(Lin)". Thereafter, the final musical tone signal is outputted from "DSP8a(Lout)". In this process, the DSP 7a adds the signal oscillated therein to the input signal, while the DSP 8a adds the signal oscillated therein to the output signal of DSP 7a. Thus, function of the foregoing mixer 13 can be achieved. At next slot 4, as similar to slot 3, the musical tone signal corresponding to the stereophonic right-channel component is to be formed.

[B] Operation

Figure 4:
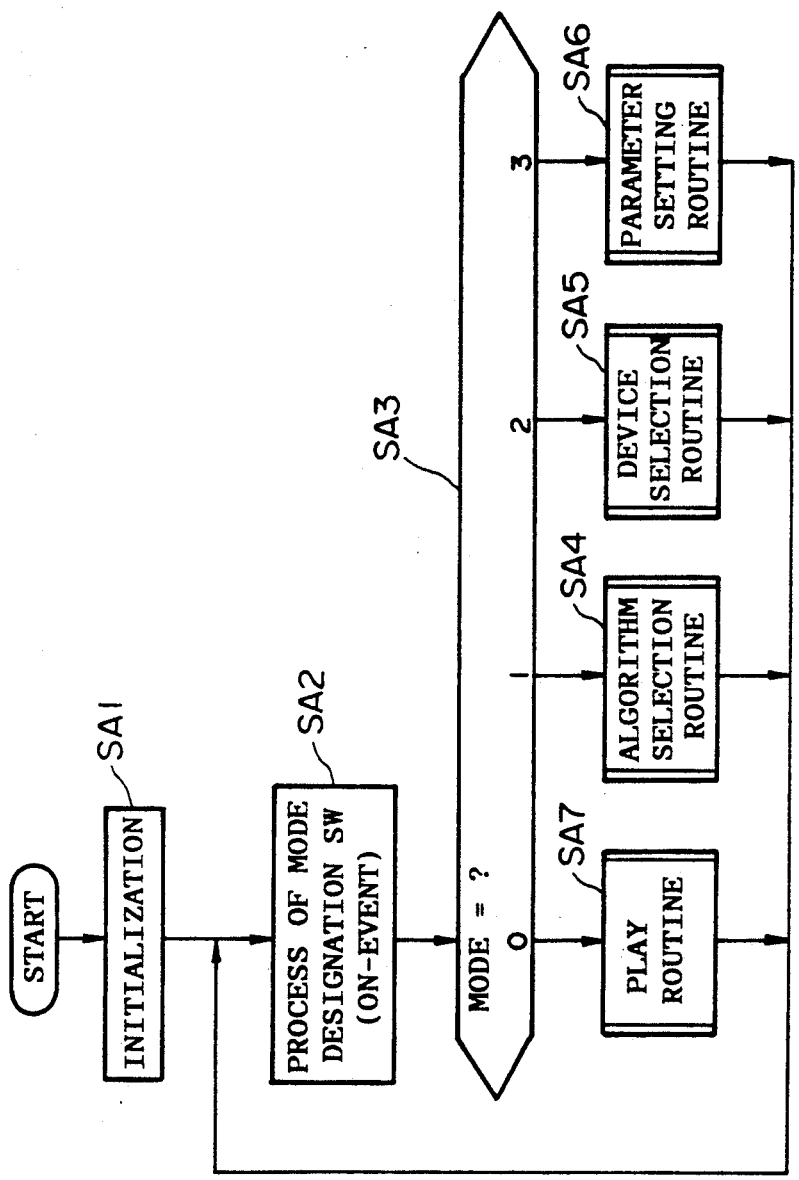
FIG. 4 is a flowchart showing a main routine of an operation of the present embodiment to be executed.

Next, description will be given with respect to the operation of the present embodiment by referring to FIGS. 4 to 17. First, when the power is on in the electronic musical instrument according to the present embodiment, main routine as shown in FIG. 4 is activated, so that processing of the CPU 1a proceeds to step SA1. In step SA1, several kinds of registers are reset, so that initialization is carried out. In next step SA2, the CPU 1a inputs switch setting information for the mode designation switch which is contained in the foregoing control elements 3 in order to designate the operation mode of the present electronic musical instrument. As the operation modes, there are provided "play mode" (i.e., mode 0) wherein the performance operation is made, "algorithm selection mode" (i.e., mode 1) wherein the tone-generation algorithm of the sound source 5 is selected, "device selection mode" (i.e., mode 2) wherein the device for carrying out the performance operation is selected and "parameter setting mode" (i.e., mode 3) wherein the sound source parameters are set.

In next step SA3, the processing is delivered to one of steps SA4-SA7 in response to the operation mode corresponding to the setting manner (i.e., modes 0-3) of the above-mentioned mode designation switch. More specifically, the processing proceeds to step SA4 when "mode 1" is designated, while the processing proceeds to step SA5 when "mode 2" is designated. In addition, the processing proceeds to step SA6 when "mode 3" is designated, while the processing proceeds to step SA7 when "mode 0" is designated.

Next, description will be given with respect to the operation of the present embodiment in each mode.

① Algorithm Selection Mode

Figure 7:
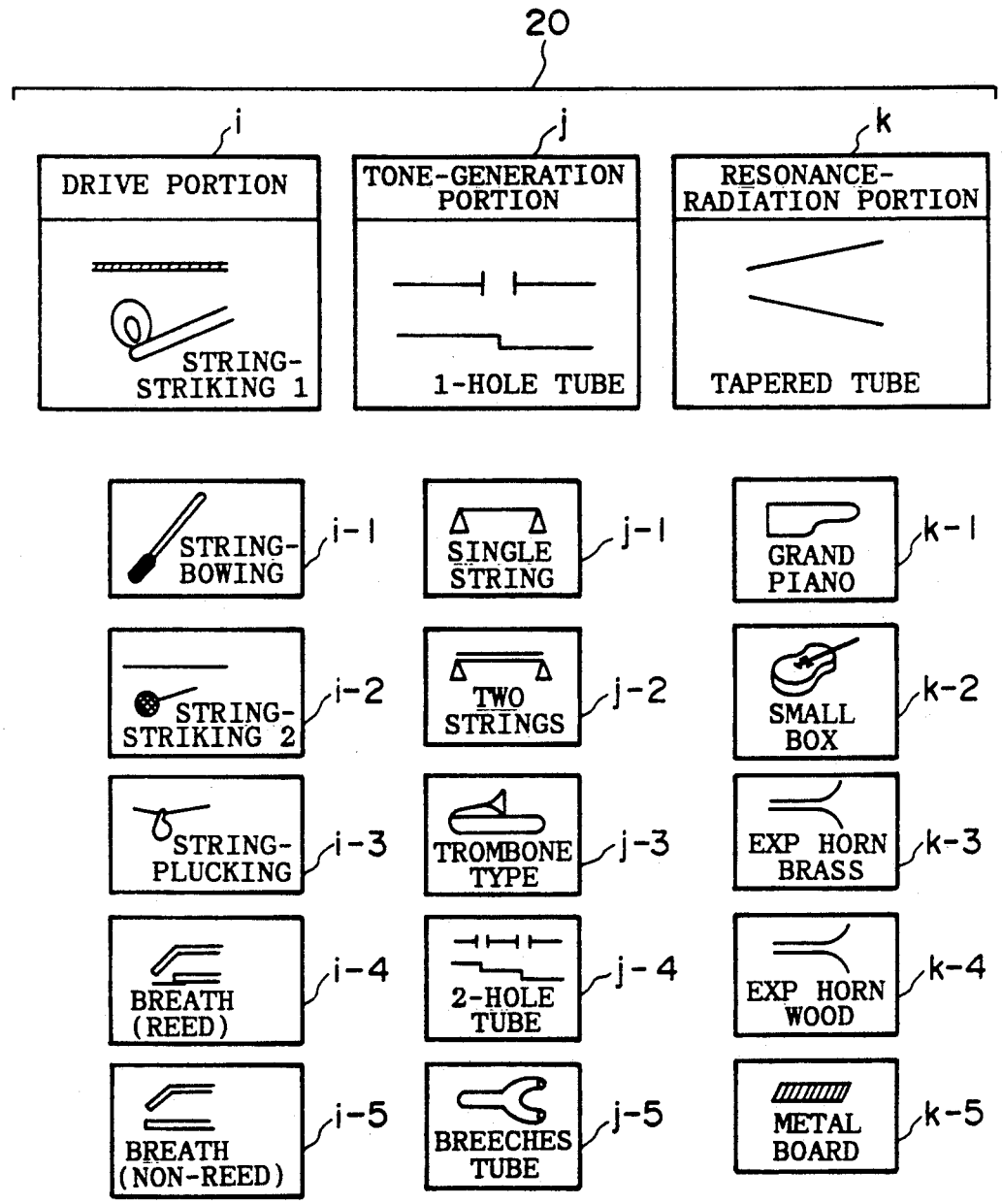
FIG. 7 illustrates an example of a screen image of an initial menu which is displayed by the present embodiment when the algorithm selection routine is started.

When the mode designation switch is set at mode 1, the processing proceeds to step SA4 in accordance with the judgement result of step SA3, so that algorithm selection routine is to be activated. When the algorithm selection routine is started, algorithm display program (not shown) is executed, so that the display unit 4 will display an image of the initial menu as shown in FIG. 7.

This initial menu is a graphic image of the foregoing algorithm of the sound source 5. Hereinafter, description will be given with respect to this initial menu. In FIG. 7, 20 designates a sound source algorithm display portion which represents the operation manner of the sound source 5. This portion 20 displays the micro-programs by which the drive unit 6, tone-generation unit 7 and resonance-radiation unit 8 are respectively operated in form of "icon". This "icon" illustrates the operation manner of the instrument to be simulated by each of the units 6 to 8. In the present example, icon of drive portion i representing the operation of the drive unit 6 illustrates "string-striking 1" wherein the hammer strikes the string; icon of tone-generation portion j representing the operation of the tone-generation unit 7 illustrates "1-hole tube"; and icon of resonance-radiation portion k representing the operation of the resonance-radiation unit 8 illustrates "tapered tube". As each of the above-mentioned drive portion i, tone-generation portion j and resonance-radiation portion k, it is possible to select desirable icon by the process of the algorithm selection routine which will be described later. More specifically, it is possible to select one of icons i-1 to i-5 for the drive portion i, icons j-1 to j-5 for the tone-generation portion j and icons k-1 to k-5 for the resonance-radiation portion k.

Figure 5:
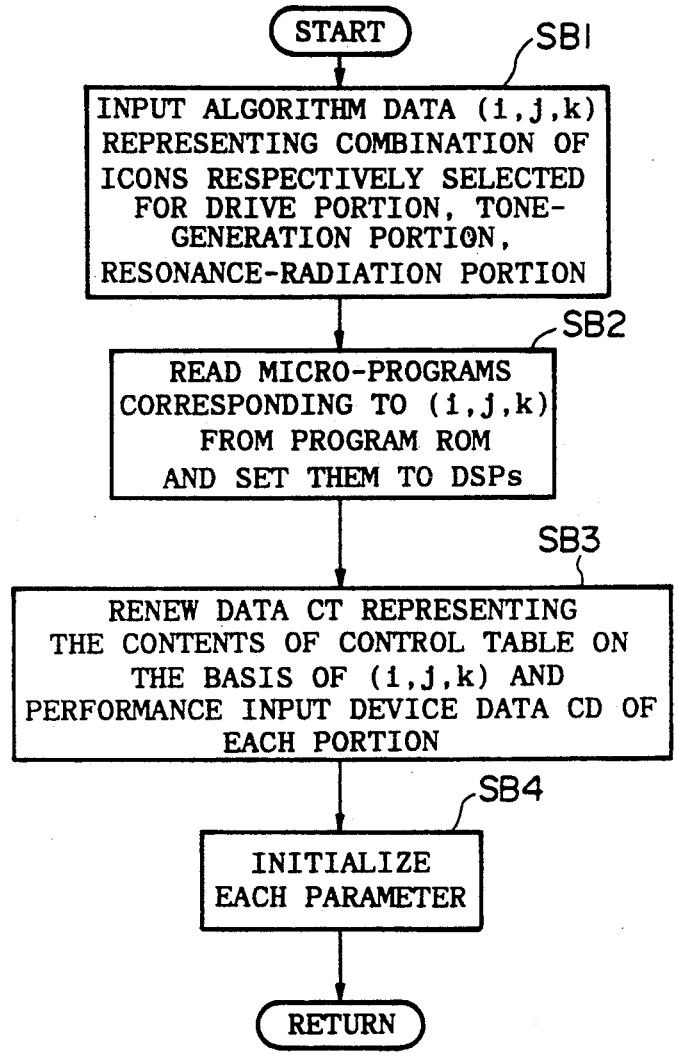
FIG. 5 is a flowchart showing an algorithm selection routine.

Next, description will be given with respect to the algorithm selection routine by which desirable icon is selected so as to set the desirable tone-generation algorithm of the sound source 5 by referring to FIG. 5. First, when the display operation of the foregoing initial menu is completed, the processing proceeds to step SB1. When the mouse-type device is used as the pointing device 11, icon selected by this mouse-type device is registered to the sound source algorithm display portion 20 in step SB1. For example, when icons i-1 (i.e., string-striking), j-1 (single string) and k-2 (small box) are respectively selected for the drive portion i, tone-generation portion j and resonance-radiation portion k, the sound source algorithm simulating the violin is registered to the display portion 20. In next step SB2, algorithm data (i,j,k) which is registered to the display portion 20 as described above is read by the CPU 1a. In response to the read data (i,j,k), the CPU 1a reads out the corresponding micro-programs from the program ROM 1b. Then, the read micro-programs are respectively loaded to the drive DSP 6a, tone-generation DSP 7a and resonance-radiation DSP 8a in accordance with the algorithm data (i,j,k). Thus, each DSP is controlled to be in the operation manner corresponding to the selected algorithm.

In next step SB3, the contents of the control table CT is renewed on the basis of the algorithm data (i,j,k) and performance input device data CD. As described before, this performance input device data CD indicates the number of the performance input element by which the performance data is supplied to No.s (where s=1-4) register of each DSP. The control table CT memorizes table addresses which are used to carry out the scaling operation on the output data of the performance input element designated by the data CD.

In step SB3, the contents of the control table CT is renewed on the basis of the foregoing algorithm data (i,j,k) and performance input device data CD of each portion. As described before, the performance input device data CD represents the number of the performance input element by which the performance data is supplied to No.s (where s=1-4) register of each DSP. In addition, the control table CT memorizes the table addresses which are used when carrying out the scaling operation on the output data of the performance input element designated by the data CD.

In last step SB4, in each of DSPs 6a, 7a, 8a, the sound source parameter designated by the control table CT and device data CD is set as its initial value. As a result, each DSP functions to simulate the selected instrument. Thereafter, the processing returns to the foregoing main routine as shown in FIG. 4.

② Device Selection Mode

Figure 8:
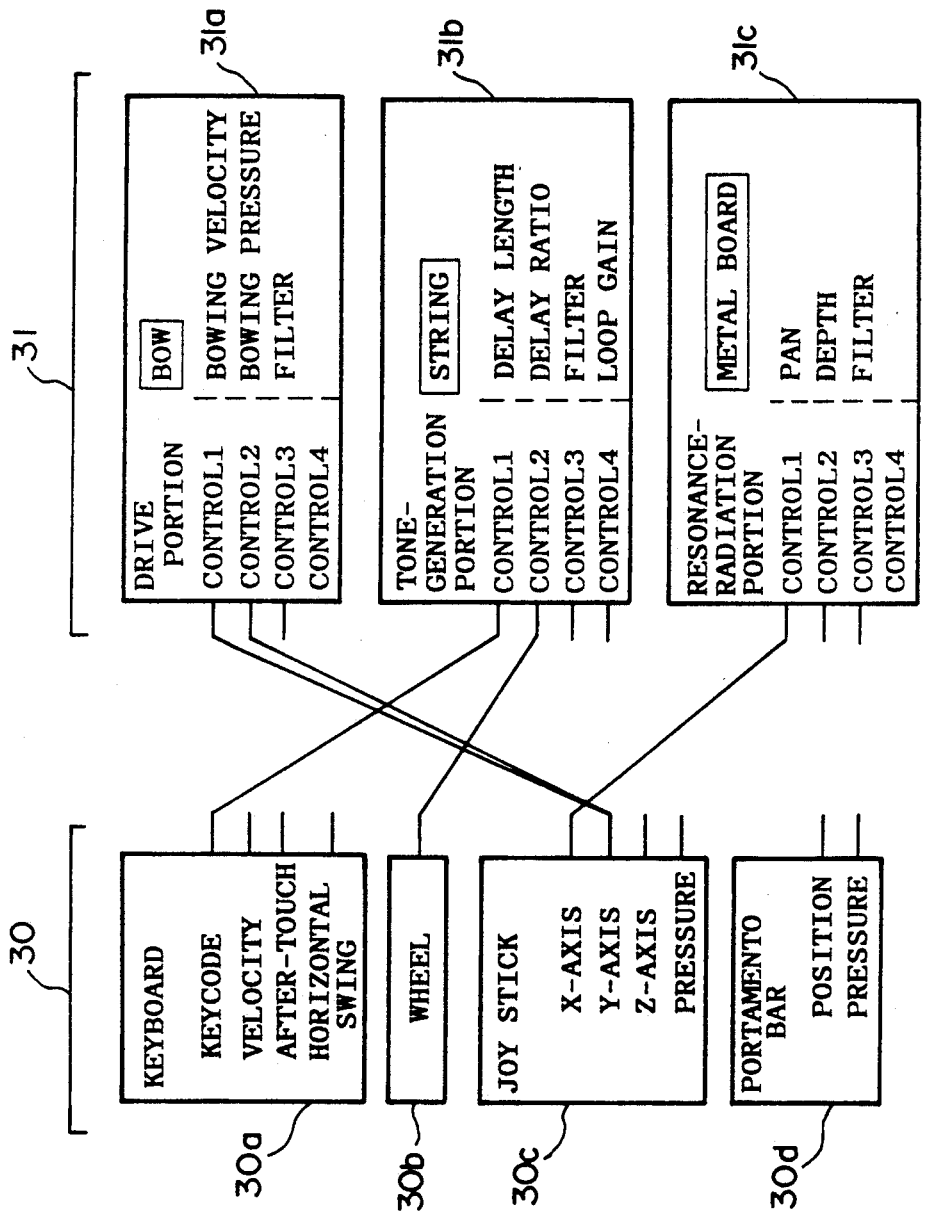
FIG. 8 illustrates an example of a screen image for the device selection to be displayed when the device selection routine is started.

When the mode designation switch is set at mode 2, the processing proceeds to step SA5 in accordance with the judgement result of step SA3 in FIG. 4, so that the device selection routine is activated. When this device selection routine is activated, device display program (not shown) is executed, so that the display unit 4 displays a screen image of device selection menu as shown in FIG. 8.

This device selection image is a graphic display image in which each DSP of the sound source 5 is controlled on the basis of the information of certain performance input element. Hereinafter, description will be given with respect to this device selection image. In FIG. 8, 30 designates a display portion which displays the performance input element registered as the performance input device. In the present embodiment, keyboard 30a, wheel 30b, joy stick 30c and portamento bar 30d are registered as the performance input elements displayed in the display portion 30, for example. On the other hand, 31 designates another display portion which displays the operation manner of each of the DSPs contained in the sound source 5, i.e., contents of the instrument to be selected for each portion under operation of the foregoing algorithm selection routine. In an example of FIG. 8, the bow (i.e., string-bowing type) is set in a drive portion 31a, and bowing velocity, bowing pressure and filter are set as the sound source parameters. In addition, the string is set in a tone-generation portion 31b, and delay length, delay ratio, filter and loop gain are set as the sound source parameters. Further, metal board is set in a resonance-radiation portion 31c, and pan, depth and filter are set as the sound source parameters.

As described above, the operation parameters are set in each portion. Then, these portions are connected to respective performance input elements, which are registered on the basis of the foregoing device data, on the screen. Thus, the user can identify the control relationship between the performance input element and DSP with ease.

Figure 6:
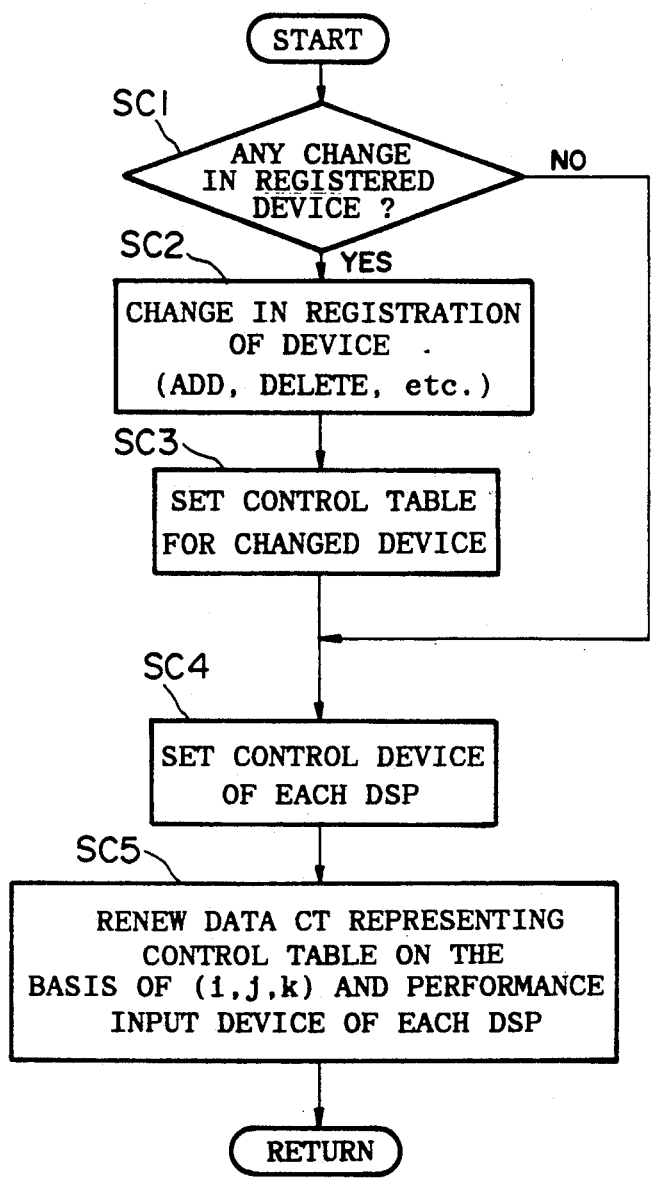
FIG. 6 is a flowchart showing a device selection routine.

Next, description will be given with respect to the device selection routine by referring to FIG. 6 wherein the performance input element is determined by use of the displayed connection. When the device selection menu is completed, the processing proceeds to step SC1 in FIG. 6 wherein it is judged whether or not the currently registered performance input element is changed. This step judges that the performance input element is changed when the displayed connection information is changed by the pointing device 11 such as the mouse-type device. When there is a change, the judgement result of step SC1 turns to "YES", so that the processing proceeds to step SC2 wherein the displayed connection is changed in accordance with the change made by the pointing device 11. For example, when the pointing device 11 is operated to connect "keycode" of the keyboard 30a in FIG. 8 with "control 1" of the drive portion 31a, the previous displayed connection is changed such that "keycode" is connected to "control 1". In next step SC3, the contents of the control table CT is set again in response to the changed performance input element. Then, the processing proceeds to step SC4 wherein new control device data CD is set in response to the above-mentioned change.

Meanwhile, if no change is made in the device selection menu so that the previous displayed connection is remained as it is, the judgement result of step SC1 turns to "NO", so that the processing directly proceeds to step SC4 wherein only the device data CD is renewed. In next step SC5, the table address of the control table CT is renewed in accordance with the contents of the control table CT which is set in the foregoing process of step SC3. Thereafter, the processing returns to the main routine. As a result, each DSP will operate in response to the function of the performance input element of which operation is newly defined. Thus, it is possible to arbitrarily define the function of the performance input element. Therefore, in addition to the normal performance technique, it is possible to carry out another performance technique by use of the same performance input element. For example, performance of the stringed instrument can be made by use of the keyboard.

③ Parameter Setting Mode

When the mode designation switch is set at mode 3, the processing proceeds to step SA6 in accordance with the judgement result of step SA3, so that the parameter setting routine is activated. In this parameter setting routine, the present system carries out the editing operation on the control parameters to be set to the drive DSP 6a, tone-generation DSP 7a and resonance-radiation DSP 8a, and it also carries out the graphic display of the whole algorithm in the sound source 5.

Figure 9:
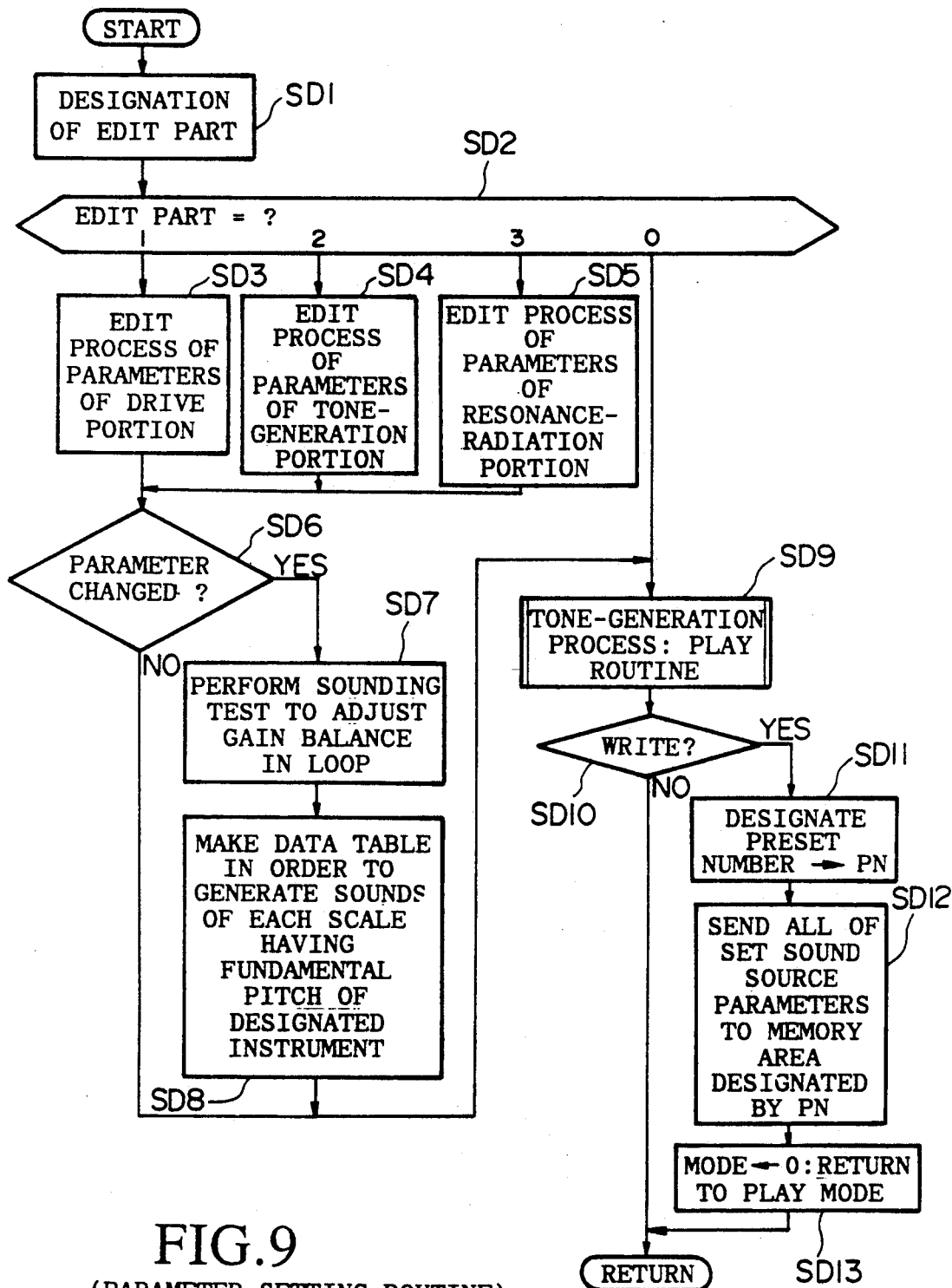
FIG. 9 is a flowchart showing a parameter setting routine.

First, when this routine is activated, the processing of CPU 1a proceeds to step SD1 in FIG. 9, wherein the display unit 4 displays the contents of the control parameter CP of the DSP to be edited as the text display. Herein, the operator input digits in accordance with the prompt text (corresponding to edit parts). Such digit input in the edit part has the following meanings.
  i) Edit part "1": control parameter CP in the drive DSP 6a is to be edited.
  ii) Edit part "2": control parameter CP in the tone-generation DSP 7a is to be edited.
  iii) Edit part "3": control parameter CP in the resonance-radiation DSP 8a is to be edited.
  iv) Edit part "0": no editing is made, so that the tone-generation is made on the basis of the control parameters CP which are currently set.

Figure 13:
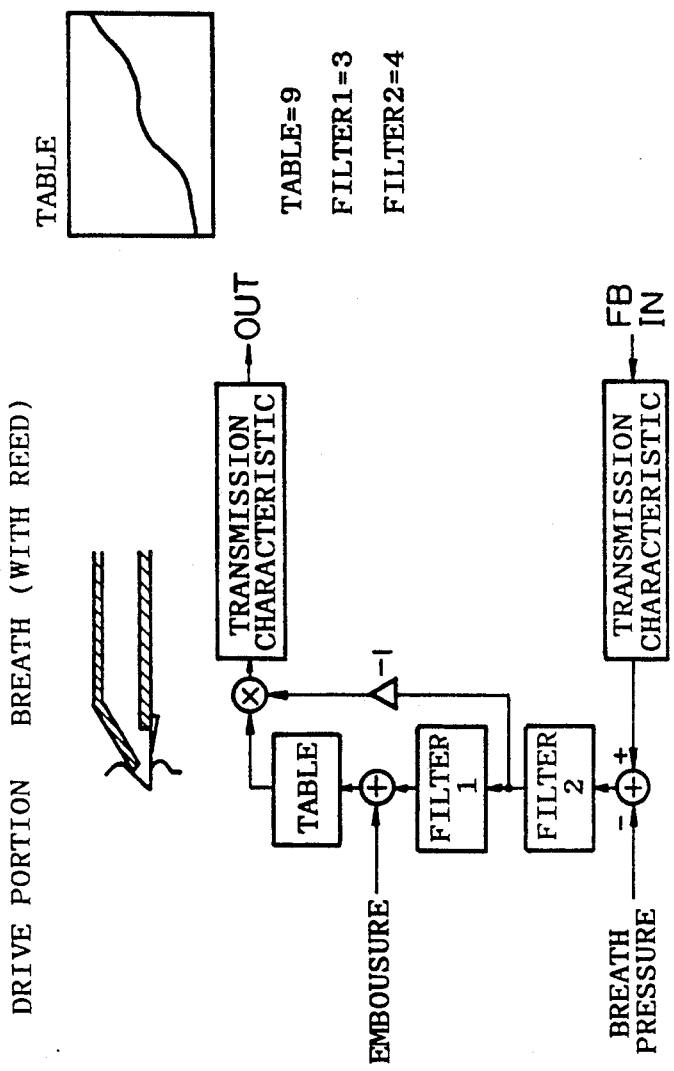

Thereafter, the processing proceeds to step SD2 wherein the input digit is judged, so that the processing branches to the desirable step corresponding to the input digit. For example, when "1" is inputted, the processing proceeds to step SD3 wherein the control parameter CP in the drive DSP 6a is to be edited. Such editing operation is made by the graphic display of the algorithm of the drive unit 6 as shown in FIG. 13. FIG. 13 illustrates an example of the graphic display which represents the algorithm simulating the operation of the reed such as the clarinet. In this example, the filter and non-linear table which simulates the non-linear operation of the reed are displayed. Herein, it is possible for the operator to change them or add new parameters.

Figure 11:
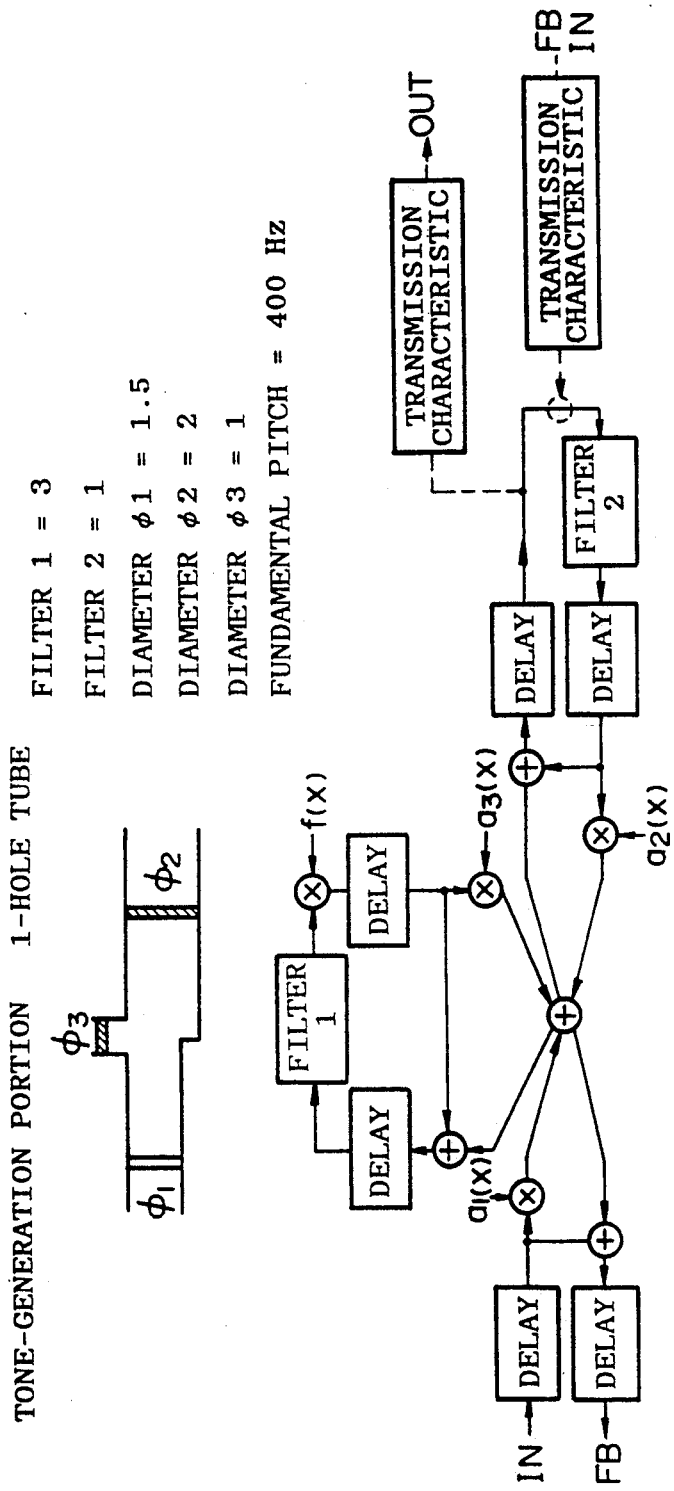
Figure 12:
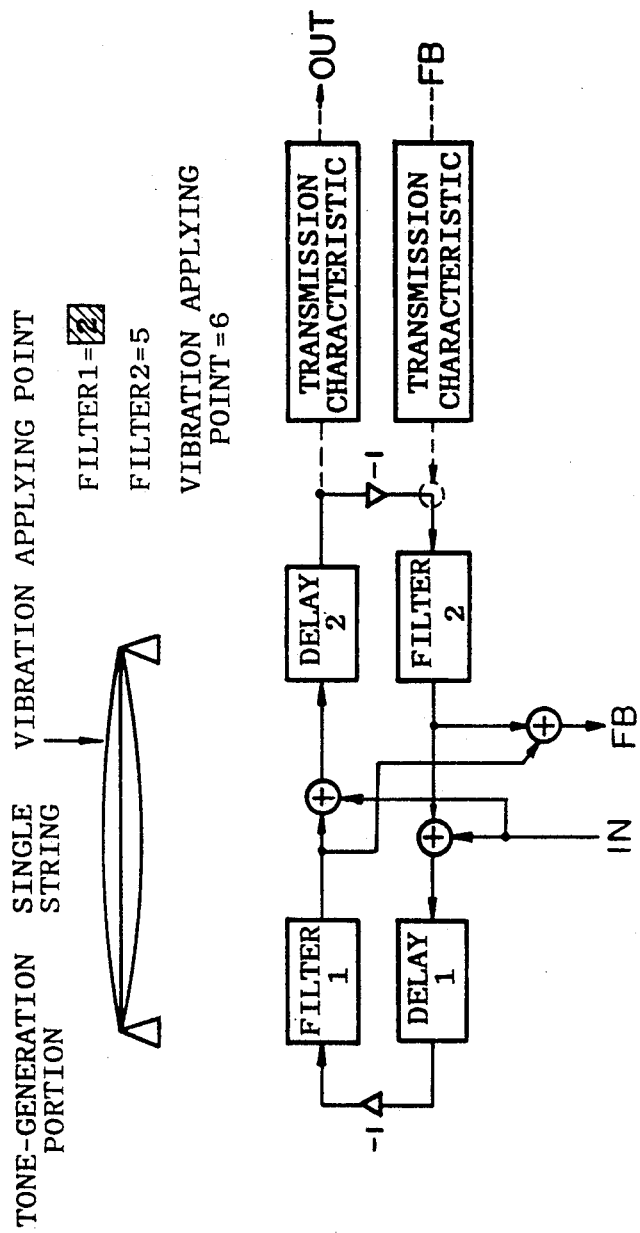

Next, when "2" is inputted, the processing proceeds to step SD4 wherein the control parameter CP of the resonance-radiation DSP 8a is to be edited. This editing operation is made by the graphic display of the algorithm of the tone-generation unit 7 as illustrated in FIGS. 11, 12. FIG. 12 illustrates an example which displays the algorithm simulating the tone-generation mechanism of the string such as the guitar. As the control parameters CP, this example uses the filter which simulates the string vibration and the vibration applying point on the string. Herein, it is possible to change them or add new parameters.

Figure 10:
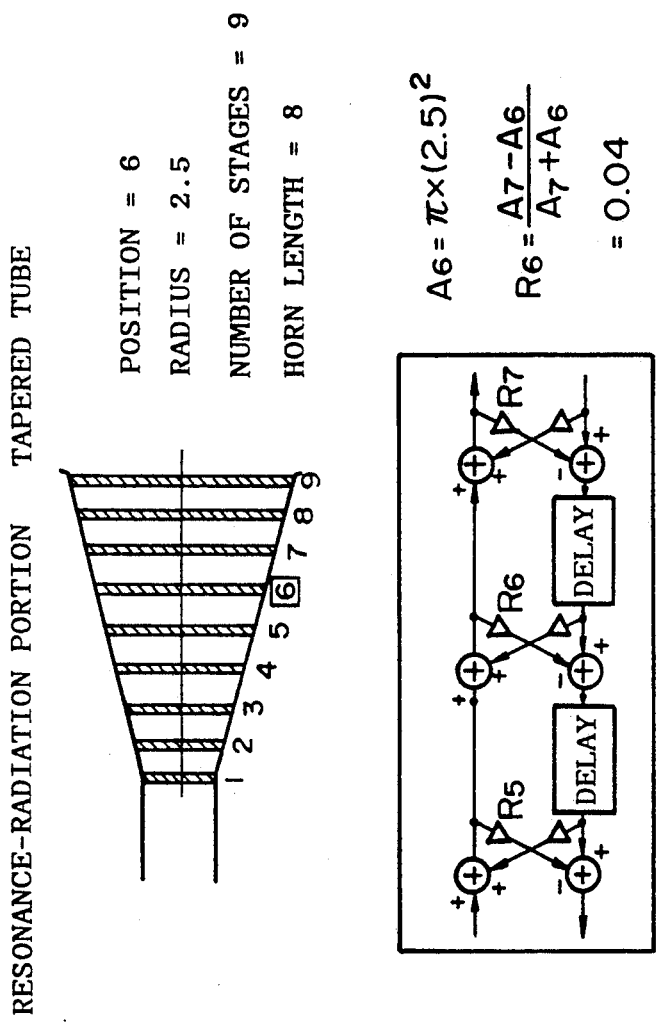
FIGS. 10 to 13 are drawings each illustrating an example of a screen image to be displayed when the parameter setting routine is executed.

Next, when "3" is inputted, the processing proceeds to step SD5 wherein the control parameter CP of the resonance-radiation DSP 8a is to be edited. This editing operation is made by the graphic display of the algorithm of the resonance-radiation unit 8 as shown in FIG. 10. FIG. 10 illustrates an example which displays the algorithm simulating the resonance radiation of the tapered tube. As the control parameters, this example uses the data defining the shape of this tapered tube, i.e., position of the tube, its radius, number of stages and horn length. Herein, it is possible to change them or add new parameters.

After completing each of the processes of steps SD3 to SD5, the processing proceeds to step SD6 wherein it is judged whether or not the control parameter CP of each DSP is changed. If the control parameter CP is added or corrected, the judgement result of step SD6 turns to "YES", so that the processing proceeds to step SD7 wherein on the basis of the changed control parameter CP, the sound source 5 is driven to make a sounding test. In this sounding test, gain balance of the closed loop of the sound source 5 is adjusted to avoid the anomalous oscillation. In next step SD8, data table is made in order to generate sounds of each musical scale having the fundamental pitch under the operation manner of the instrument to be simulated, i.e., instrument which is defined by the control parameters CP.

Meanwhile, if the judgement result of step SD6 is "NO", or if "0" is inputted in the process of step SD1, the processing proceeds to step SD9 representing the play routine which will be described later. In this routine, the tone-generation is carried out on the basis of the control parameters CP to be set in each DSP. Incidentally, detailed description will be made later with respect to this play routine.

In next step SD10, it is judged whether or not the edited control parameter CP is written into the writable non-volatile memory (not shown). If the operator decides to register the edited control parameter into the memory by referring to the result of the tone-generation process described before, such decision is inputted by the key-in operation, so that the judgement result of step SD10 turns to "NO". Then, the processing proceeds to step SD11. If not, the judgement result of step SD10 turns to "NO", so that the processing returns to the foregoing main routine. In this case, the control parameters CP are temporarily stored in the register of the CPU 1a. Therefore, they are erased with the power off.

In step SD11, the operator inputs the present number PN which is used when registering the edited control parameter CP into the memory. In next step SD12, all of the sound source parameters are registered in the predetermined memory area designated by the inputted present number PN. Then, the processing proceeds to step SD13. Herein, all of the sound source parameters contains the control parameters CP, control device data CD and control table data CT. In last step SD13, the current operation mode, i.e., parameter setting mode (i.e., mode 3) is reset to the play mode (i.e., mode 0). Thus, processes of this routine is completed.

④ Play Mode

Figure 14:
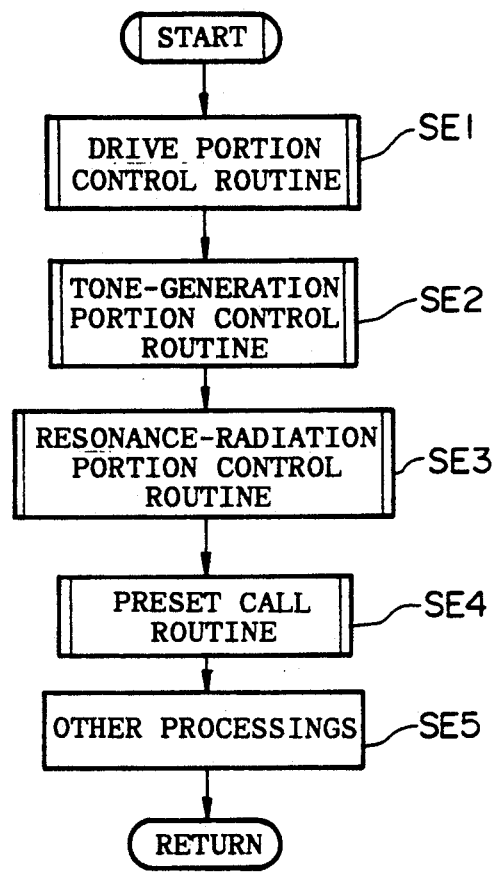
FIG. 14 is a flowchart showing a play routine.

This mode is activated when the edited control parameters CP are registered into the memory as described before, or when the mode designation switch is set at mode 0. Herein, according to the judgement result of step SA3, the processing proceeds to step SA7, so that the play routine as shown in FIG. 14 is to be started. In this play routine, each of the data set in the internal registers 40-42 of the DSPs as shown in FIG. 16 is read out, so that the musical tone of the simulating instrument can be generated in response to the performing operation.

Figure 15:
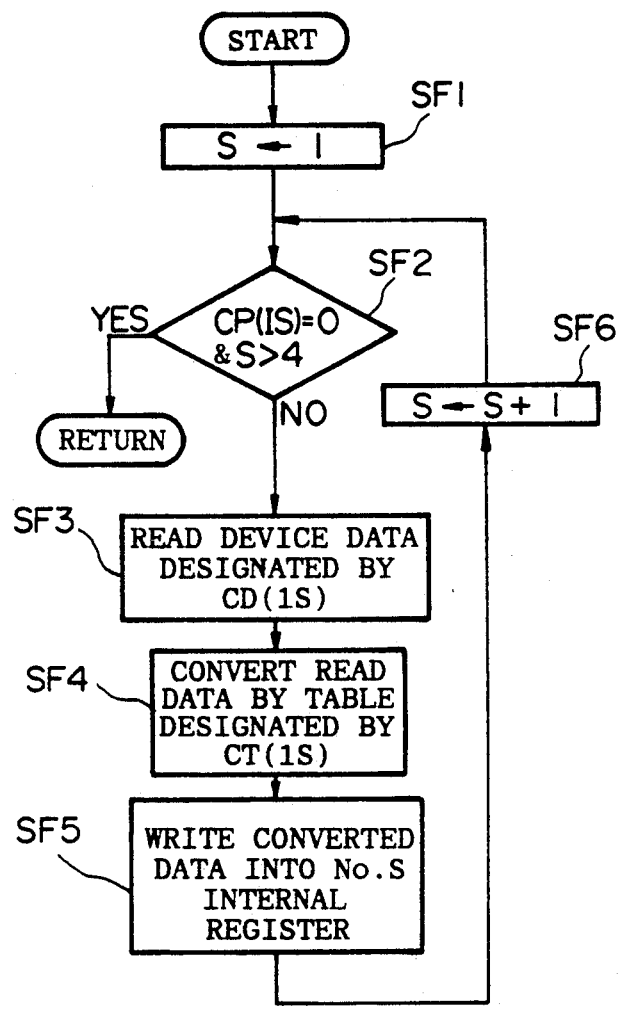
FIG. 15 is a flowchart showing a sub-routine of the play routine which is used for explaining a drive portion control routine, a tone-generation portion control routine and a resonance-radiation portion control routine to be executed during execution of the play routine.

In first step SE1 of this routine, the drive-portion control routine, as shown in FIG. 15, is started, so that the processing proceeds to step SF1. In step SF1, a variable "s" representing each of the registers is set at "1" in order to read out each of the data to be set to the internal register 40 of the drive DSP 6a. In next step SF1, it is judged whether or not the control parameter CP(11) is not at "0" and the variable s is larger than "4". If some data is set as the control parameter CP(11), the judgement result of step SF2 turns to "NO", so that the processing proceeds to step SF3. In step SF3, the performance information of the performance input element designated by the control device data CD(11) is read, and then the processing proceeds to step SF4 wherein the scaling operation is carried out on the read performance data by use of the data table designated by the control table CT(11). In step SF5, the scaled data is written into the internal register R1 in the drive DSP 6a. Thus, the DSP 6a generates the foregoing excitation signal. In next step SF6, the foregoing variable s is incremented so as to repeat the above-mentioned processes. Thereafter, until the control parameter CP(1s) becomes equal to "0", i.e., until no control parameter is existed, the read-out operation is made repeatedly on each data. As a result, the DSP 6a can sequentially correct the excitation signals in response to the other control parameters CP.

Next, when the processing proceeds to step SE2 in FIG. 14, the tone-generation-portion control routine is to be started. In this tone-generation-portion control routine, processes as similar to those of the foregoing step SE1 are executed. More specifically, in order to read out each of the data to be set in the internal register 41 of the tone-generation DSP 7a, the CPU 1a sets the variable s representing each of the register at "1". Next, it is judged whether or not the control parameter CP(21) is not at "0" and variable s is larger than "4". If some data is set as the control parameter CP(21), the CPU 1a reads in the performance information of the performance input element designated by the control device data CD(21) so as to carry out the scaling operation on the read performance information by use of the data table designated by the control table CT(21). Then, the scaled data is written into the internal register R1 in the DSP 7a. The above-mentioned processes are repeatedly executed every time the variable s is incremented. Until the control parameter CP(2s) becomes equal to "0", i.e., until no control parameter CP is existed, the read-out operation is made repeatedly on each data. Thus, the DSP 7a can carry out the tone-generation operation of the instrument to be simulated, and it also oscillates the excitation signal supplied from the drive portion 6.

In next step SE3, the resonance-radiation-portion control routine is started. In this resonance-radiation-portion control routine, processes as similar to those of the foregoing steps SE1, SE2 are executed, so that the DSP 8a can reproduce the resonance-radiation characteristic of the instrument to be simulated.

As described above, in the steps SE1 to SE3, each of the DSPs is operated in response to the set tone-generation algorithm, assigned performance input element and set control parameters CP which are made in the foregoing modes 1-3, thus, it is possible to perform a music by the desirable musical tones.

By the way, when changing the tone color of the musical tone which is generating now by the performing operation, the read-out operation is made on the preset data which is registered in the foregoing parameter setting mode. Herein, the preset data indicate the foregoing all sound source parameters and micro-programs which define the tone-generation algorithms of each DSP. In order to carry out such data read-out operation, the preset switch provided in the control elements 3 is operated. When this preset switch is operated, the CPU 1a detects its switch on-event, so that the preset call routine of step SE4 is started. When this preset call routine is started, the processing of the CPU 1a proceeds to step SG1 shown in FIG. 17. In step SG1, the CPU 1a reads the identification number PN of the preset switch to be operated. In next step SG2, in accordance with the read-out address which is defined by the read identification number PN of the preset switch, the preset data is read from the non-volatile memory. Then, the micro-programs in the read preset data are respectively delivered to the DSPs. In next step SG3, the control device data CD in the read preset data is written into the predetermined work memory. Next, the processing proceeds to step SG4 wherein the control parameter CP set to each DSP is rewritten into the preset value. Thus, each DSP operates to simulate the instrument defined by the preset value, and consequently it is possible to perform a music with the musical tone having the different tone color.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. An electronic musical instrument comprising
   a drive means for generating an excitation signal corresponding to tone-generation energy;
   a tone-generation means for resonating said excitation signal to thereby output a resonated signal;
   a plurality of drive algorithms and a plurality of tone generation algorithms representing different operation manners of the drive means and tone-generation means, respectively;
   display means for displaying a graphic pattern representative of a selected drive algorithm and a selected tone-generation algorithm; and
   algorithm control means for varying the operation manners of said drive means and said tone-generation means to operate in accordance with the displayed pattern as selected by a performer.

2. An electronic musical instrument for simulating plural instruments comprising:
   sound source means for outputting a musical tone signal in accordance with a tone-generation algorithm which is pre-defined for each of instruments to be simulated;
   display means for displaying a representation of said tone generation algorithm in form of a predetermined graphic pattern comprised of plural portions of musical instruments which may be selected by a performer; and
   algorithm control means for controlling said display means in accordance with an operation made by a performer to display selected portions of musical instruments and for varying the contents of the tone-generation algorithm to correspond to the display.

3. An electronic musical instrument as defined in claim 2 wherein said sound source means contains a drive portion, a tone-generation portion and a resonance-radiation portion all of which function to create said musical tone signal corresponding to an instrument to be simulated.

4. An electronic musical instrument as defined in claim 3 wherein each portion of said sound source means contains a digital signal processor (DSP) which outputs operation data corresponding to sampling data of sounds of an instrument to be simulated.

* * * * *